United States Patent [19]

Sakaguchi et al.

[11] Patent Number: 5,586,436
[45] Date of Patent: Dec. 24, 1996

[54] MASTER CYLINDER RESERVOIR

[76] Inventors: Shozo Sakaguchi; Mitsuhiro Ikeda; Syusaku Chiba, all of c/o Matsuyama Plant, Jidosha Kiki Co., Ltd. 11-6, Shinmei-cho, 2-chome, Higashimatsuyama-shi, Saitama-ken, Japan

[21] Appl. No.: 494,679

[22] Filed: Jun. 23, 1995

[30] Foreign Application Priority Data

Jun. 30, 1994 [JP] Japan ................................ 6-148908

[51] Int. Cl.⁶ .................................................. B60T 11/26
[52] U.S. Cl. ........................................ 60/585; 220/367.1
[58] Field of Search ............................... 60/585; 220/304, 220/367, 374

[56] References Cited

U.S. PATENT DOCUMENTS

| | | | |
|---|---|---|---|
| 4,602,482 | 7/1986 | Kubota et al. | 220/304 |
| 5,277,327 | 1/1994 | Nakano et al. | 60/585 |
| 5,347,813 | 9/1994 | Yanagi et al. | 60/585 |

FOREIGN PATENT DOCUMENTS

| | | | |
|---|---|---|---|
| 2636606 | 2/1977 | Germany | 60/585 |
| 3918457 | 12/1989 | Germany | 60/585 |

Primary Examiner—Thomas E. Denion
Attorney, Agent, or Firm—Law Office of Timothy N. Trop

[57] ABSTRACT

The present invention aims to provide a master cylinder reservoir in which the leakage of hydraulic fluid is prevented. To achieve the above object, in the master cylinder reservoir of the present invention in which a diaphragm is interposed between a cap and a body to define an upper chamber communicating with the outside and a lower chamber communicating with a reservoir chamber, and a slit is formed in the diaphragm so that the slit is opened by the deformation of diaphragm caused by the pressure difference acting on the upper and lower surfaces of the diaphragm, by which communication is permitted between the upper and lower chambers, a plate is disposed below the diaphragm in such a manner as to substantially cover the diaphragm, and a vent hole communicating between the upper and lower surfaces of the plate is provided.

2 Claims, 2 Drawing Sheets 5,586,436

MASTER CYLINDER RESERVOIR

FIELD OF THE INVENTION AND RELATED ART STATEMENT

The present invention relates to a master cylinder reservoir.

Master cylinder reservoirs include reservoirs of what we call a semi-moisture type in which the reservoir chamber is isolated from the outside to prevent the entrance of foreign matters into the reservoir chamber from the outside and to prevent the leakage of fluid from the reservoir chamber to the outside, and a stop valve to is provided to keep the pressure in the reservoir chamber at atmospheric pressure. The reservoir of this type is disclosed in, for example, Japanese Utility Model Publication No. 3-27017 (No. 27017/1991) and Japanese Utility Model Provisional Publication 7-11468 (11468/1995).

In the reservoir of this type, a diaphragm is interposed between a cap and a body to define an upper chamber communicating with the outside and a lower chamber composing a reservoir chamber, and a slit or an air valve is formed in the diaphragm to compose a stop valve. The slit or the valve is opened by the deformation of diaphragm due to the pressure difference acting on the upper and lower surfaces of the diaphragm, by which the upper and lower chambers are allowed to communicate with each other and the pressure in the lower chamber is kept at atmospheric pressure.

In the reservoir of this type, however, when the pressure in the reservoir chamber increases, by which the slit or the valve is opened, and the air in the reservoir chamber is allowed to escape to the upper chamber, there is a possibility that hydraulic fluid such as brake fluid sticking to the lower surface of the diaphragm leaks to the upper chamber through the slit or the valve and accumulates in the upper chamber.

Thus, the hydraulic fluid accumulated in the upper chamber may be leaked to the outside through the vent hole of the cap by vibration or thermal rising etc.

OBJECT AND SUMMARY OF THE INVENTION

Accordingly, an object of the present invention is to provide a master cylinder reservoir in which the leakage of hydraulic fluid is prevented.

In the master cylinder reservoir of the present invention in which a diaphragm is interposed between a cap and a body to define an upper chamber communicating with the outside and a lower chamber communicating with a reservoir chamber, and slits are formed in the diaphragm so that the slits are opened by the deformation of the diaphragm caused by the pressure difference acting on the upper and lower surfaces of the diaphragm, by which communication is permitted between the upper and lower chambers, a plate is disposed below the diaphragm in such a manner as to substantially cover the diaphragm.

In this reservoir, even if the reservoir vibrates, the hydraulic fluid scarcely reach the diaphragm because it is hindered by the plate. Therefore, the hydraulic fluid does not stick to the diaphragm, so that when the air in the reservoir chamber is allowed to escape to the outside by the slit or the valve being opened, the hydraulic fluid is not discharged to the outside together with the air.

DETAILED DESCRIPTION OF PREFERRED EMBODIMENTS

Figure 1:
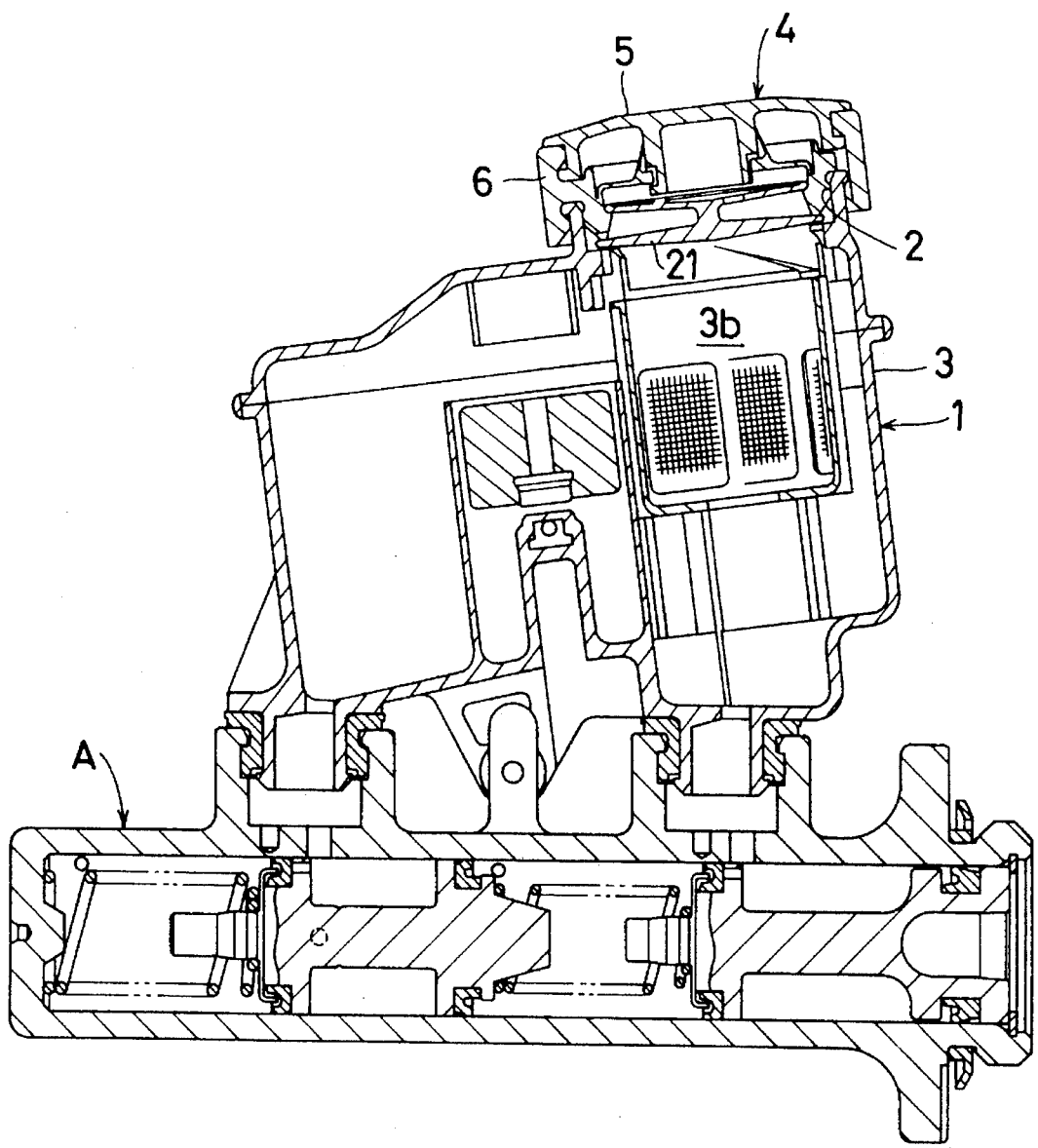
FIG. 1 is a sectional view of a master cylinder having a reservoir of the present invention.
Figure 2:
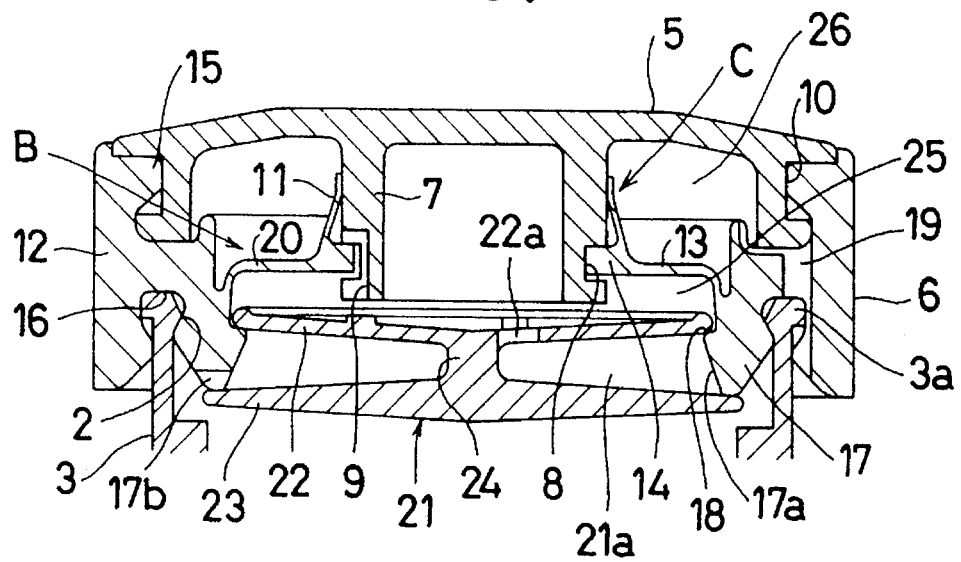
FIG. 2 is a sectional view showing the principal portion of the master cylinder reservoir in accordance with the present invention.
Figure 3:
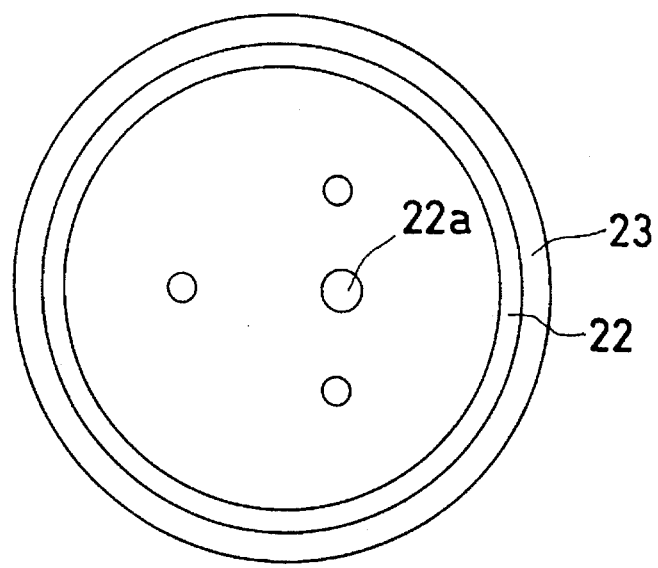
FIG. 3 is a plan view of an embodiment of a plate used in the reservoir of the present invention.
Figure 4:
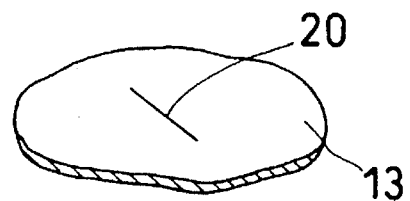
FIG. 4 is an enlarged perspective view of a slit formed in a diaphragm used in the reservoir of the present invention.

FIG. 1 shows a master cylinder having a reservoir of the present invention, and FIG. 2 shows the principal portion of the reservoir.

The master cylinder shown in FIG. 1 has a reservoir 1 disposed above a cylinder housing A. The reservoir 1 comprises a body 3, which has an aperture 2 at the upper end and contains hydraulic fluid therein, and a cap 4 for closing the aperture 2 of the body 3.

The cap 4 shown in FIG. 1 comprises a cover cap 5 formed by a material having rigidity and a body cap 6 formed by a material having elasticity.

The cover cap 5 has a column portion 7 formed by an annular rib at the center thereof. On the outer peripheral surface at lower end of the column portion 7, an annular groove 8 is formed, and a cutout 9, which is open downward, is formed at part of the whole circumference. Moreover, an annular groove 10 is formed on the outer peripheral surface of the cover cap 5.

The body cap 6 has an annular lip 11 at the center thereof, and has a thick wall portion 12 at the periphery. Between the base of the annular lip 11 and the thick wall portion 12 is formed an annular diaphragm 13.

A flange 14 facing inward is formed at the base of the annular lip 11.

At the upper part of the thick wall portion 12 is formed an annular protrusion 15 protruding inward, and at the lower part thereof is formed an annular groove 16, which is open downward. At the middle position on the inner peripheral surface of an inside annular protrusion defining the annular groove 16, a step portion 18 with the face thereof facing upward is formed, and a tapered surface 17a is formed in the range from the step portion 18 to the tip end of the annular protrusion 17. At the thick wall portion 12, a vent hole 19 passing vertically through the thick wall portion 12 is formed.

In the diaphragm 13, a slit 20 with a predetermined length is formed along the circumferential direction of the diaphragm 13. The slit 20, composing a stop valve B, is normally closed and opened when the diaphragm 13 is deformed.

Also, the reservoir 1 has a plate 21. The plate 21 comprises an upper disk portion 22, a lower disk portion 23, and a column portion 24 connecting the two disk portions with each other at the center thereof. The plate 21 is so configured that the diameter of the lower disk portion 23 is larger than that of the upper disk portion 22. The upper surface of the lower disk portion 23 slopes down toward the periphery thereof.

The cover cap 5 and the body cap 6 are joined to each other by fitting the annular protrusion 15 into the annular groove 10, fitting the annular lip 11 of the body cap 6 onto the column portion 7 of the cover cap 5, and engaging the flange 14 with the annular groove 8.

The plate 21 is fixed to the body cap 6 by pushing the periphery of the upper disk portion 22 along the tapered surface 17a of the body cap 6 and engaging it with the step portion 18 and by pressing the periphery of the lower disk portion 23 against the tip end of the annular protrusion 17.

In the cap 4 thus assembled, the tip end of the annular lip 11 of the body cap 6 abuts against the peripheral surface of the column portion 7 of the cover cap 5, thus composing an air release valve C.

In the cap 4 thus configured, the aperture 2 of the body 3 is closed by fitting the upper end 3a of the body 3 into the annular groove 16 of the body cap 6.

In this reservoir 1, even if the hydraulic fluid in the reservoir chamber 3b is waved by vibration etc., the hydraulic fluid does not reach the diaphragm 13 because it is hindered by the plate 21. Therefore, the hydraulic fluid does not stick to the diaphragm 13.

In the reservoir 1, when the pressure in the reservoir chamber 3b increases, the pressure reaches the diaphragm 13 through a cutout 17b and a hole 22a. Therefore, the diaphragm 13 is deformed by this pressure, by which the slit 20 is opened. This pressure also acts on the tip end of the annular lip 11 via the cutout 9, so that the tip end of the annular lip 11 is pushed and opened by the pressure. Thus, the air in the reservoir chamber 3b is allowed to escape to an annular chamber 21a defined between the upper and lower disk portions 22 and 23 through the cutout 17b formed on the annular protrusion 17 of the body cap 6, and further allowed to escape to a lower chamber 25 defined between the upper disk portion 22 and the diaphragm 13 through the hole 22a formed in the upper disk portion 22. The air in the chamber 25 is allowed to the chamber 26 through the slits 20 or through a gap formed between the annular lip 11 and the column portion 7. The air in the chamber 26 is allowed to escape to the outside through the vent hole 19 formed in the body cap 6.

When the pressure in the reservoir chamber 3b becomes negative, the slit 20 is opened by the pressure difference, so that the air on the outside is taken into the reservoir chamber 3b passing through the path reverse to the above.

As described above, in the master cylinder reservoir in accordance with the present invention, even if the hydraulic fluid in the reservoir chamber is splashed by vibration etc., the hydraulic fluid is prevented from sticking to the diaphragm because it is inhibited by the plate. Therefore, when the air in the reservoir chamber is allowed to escape to the outside by the slit or the valve of the diaphragm being opened, the hydraulic fluid does not leak out of the diaphragm.

Further, in the master cylinder reservoir defined in claim 3, the assembly work of the reservoir can be streamlined because the plate 21 can be assembled to the diaphragm in advance.

Still further, in the master cylinder reservoir defined in claim 4, the effect of preventing the leakage of hydraulic fluid can further be enhanced because a maze is formed in the plate 21.

What is claimed is:

1. A master cylinder reservoir comprising a diaphragm interposed between a cap and a body to define an upper chamber communicating with the outside and a lower chamber communicating with a reservoir chamber, said diaphragm having upper and lower surfaces and a peripheral edge, and a slit or an air valve is formed in said diaphragm so that said slit or said valve is opened by the deformation of said diaphragm caused by the pressure difference acting on the upper and lower surfaces of said diaphragm, by which communication is permitted between said upper and lower chambers, wherein a plate is disposed below said diaphragm in such a manner as to substantially cover said diaphragm, said plate including upper and lower surfaces, and a vent hole communicating between the upper and lower surfaces of said plate is provided, wherein the peripheral edge of said diaphragm is extended downwardly, and said plate is fixed to said extended portion, wherein a step portion is formed at the middle position on the inner peripheral surface of said extended portion, said plate comprises an upper disk portion, a lower disk portion, and a column portion for connecting the two disk portion with each other at the center thereof, and said plate is fixed to said diaphragm by engaging said upper disk portion with said step portion and engaging said lower disk portion with the lower end of said extended portion.

2. A master cylinder reservoir according to claim 1, wherein said vent hole is formed at the central portion of said upper disk portion and the lower end of said extended portion.

\* \* \* \* \*